Inventors
Archie M. Miers
William Van Der Sluys
By Wayne Morris Russell
Attorney Dec. 17, 1957  A. M. MIERS ET AL  2,816,683
HATCH COVER AND LOCK Filed May 11, 1953 2 Sheets-Sheet 2

Inventors
Archie M. Miers
William Van Der Sluys
By Wayne Morris Russell
Attorney

2,816,683

HATCH COVER AND LOCK

Archie M. Miers and William Van Der Sluys, Homewood, Ill., assignors to Pullman-Standard Car Manufacturing Company, Chicago, Ill., a corporation of Delaware Application May 11, 1953, Serial No. 354,120

2 Claims. (Cl. 220—57)

The present invention relates to a hatch cover and locking means therefor, and more particularly to a hatch cover and latch for railway cars, such as covered hopper cars or the like.

It is an object of the present invention to provide a hatchway construction in which the cover is automatically locked in closed position by pivoted latch means operable to locking position by movement of the cover to closed position.

It is another object to provide a hatch cover which in closed position is subjected to sealing pressure distributed substantially uniformly about the cover.

Another object is the provision of latch means for a hatch cover or the like automatically operable for locking engagement with the cover by movement of the cover to closed position.

Another object is the provision of latch means for a hatch cover or the like adapted to have such camming engagement with a lip member of the cover in closed position as to effect only more secure locking engagement when subjected to vibratory or similar movements of the cover.

A further object of the invention is the provision of a hatch cover or the like formed with webs to insure rigidity and prevent buckling and to distribute uniformly over the cover pressure applied to the central portion.

Another object is the provision of a hatch cover or the like having upstanding webs extending generally radially from the central portion to adjacent the periphery thereof for distributing substantially uniformly thereover pressure applied to the central portion and to prevent buckling of the cover.

Another object is the provision of a hatch cover or the like secured to a resilient hinge strap the free end of which is adapted for engagement with latch means to apply sealing pressure to the cover in closed position thereof.

It is a further object to provide a hatch cover or the like with an overlying resilient strap by which it may be urged into tightly closed position upon securement of the strap.

Another object is the provision of a latch for a hatch cover or the like which is pivotally mounted in position to be swung in one direction by a lip member of the cover in closing movement to allow closing of the cover and has biasing means returning it in the opposite direction to prevent return movement of the lip member and cover.

Still another object is the provision of a hatch frame with a cover hinged thereto and cover latch means pivotally mounted thereon as a unitary assembly.

Other and further objects, advantages, and features of the invention will appear to those skilled in the art from the following description, in conjunction with the accompanying drawings, in which.

Figure 1:
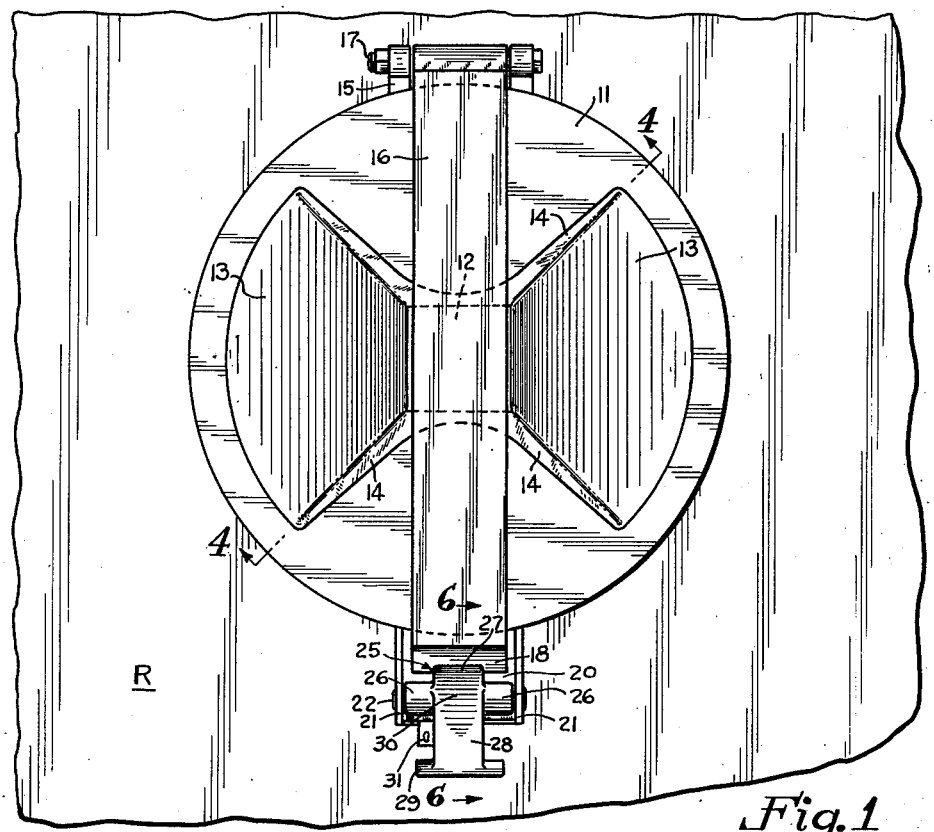
Fig. 1 is a plan of the hatch cover and lock of this invention applied to the roof of a railway car.
Figure 5:
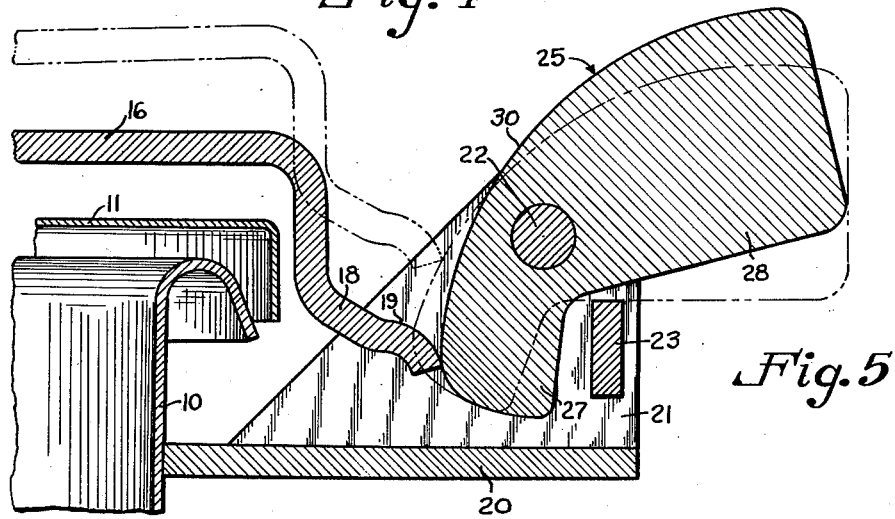
Figure 6:
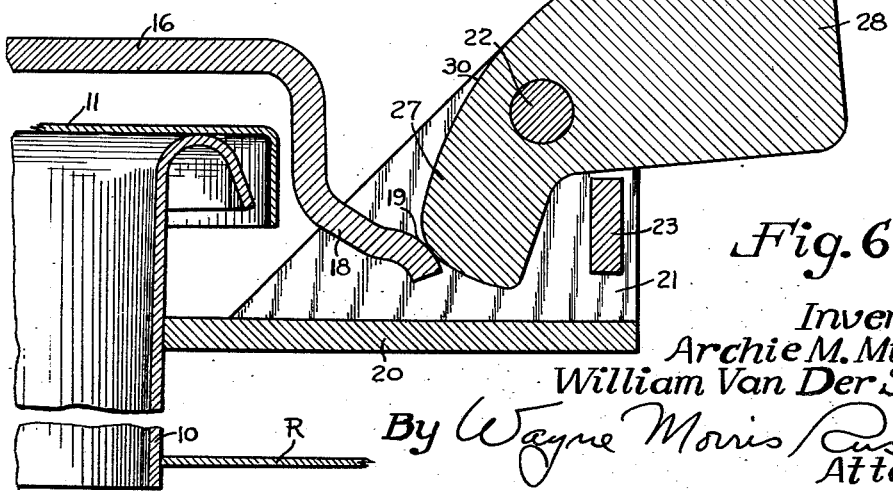

Fig. 5 is an enlarged vertical sectional view taken through the latch and adjacent parts with the cover adjacent its closed position, showing two positions of the cover locking lip and latch in broken and full lines; and Fig. 6 is a vertical sectional view through the latch and adjacent parts, taken substantially as indicated by the line 6—6 of Fig. 1, similar to Fig. 5 but showing the cover and latch in locking position.

The invention is disclosed as embodied in a cover for a hatch frame secured in the roof of a railway car. The cover is formed with a raised embossment providing a plurality of upstanding webs radiating from the central portion to adjacent the peripheral portion of the cover, the raised central portion being welded to an elongated hinge strap by which the cover may be swung between open and closed positions and which has its free end formed to provide a lip outwardly of the edge of the cover. Opposite the hinge and outwardly of the hatch frame so as to be engageable with the lip a latch is pivoted which has an integral counterweight by which it is biased into the path of the lip. When the cover is closed, the lip engages the latch to swing it out of such path and thus may swing past the locking end of the latch, which immediately is moved back into the lip path by the counterweight so as to engage over the lip and hold the cover against opening movement. The securement of the ends of the strap by the hinge and latch results in application of pressure to the central cover portion which is distributed substantially uniformly about the cover by the radial webs so that a good sealing engagement of the cover against the hatch frame is obtained. The lip and latch are formed to have a camming engagement such that vibratory movements of the cover will not cause the latch to swing to releasing position but instead will tend to effect a more secure engagement. The strap hinge and latch are preferably supported from the hatch frame by suitable brackets, so that the hatch frame, cover, and latch may form a unitary assembly.

The invention is advantageous in providing a cover which is rigid to seat closely on the hatch frame and is pressed into tight engagement uniformly around the mouth thereof to provide an effective seal. The latch is operated automatically by the closing of the cover to lock the cover in closed position, so that the cover cannot accidentally be left unlocked. In addition, the cover will not work loose due to vibration because any vibratory or similar movements of the cover result only in working the latch into more secure engagement with a lip member of the cover, if the latch is not already in its most secure latching position. The resilience of the strap aids in both the tight clamping of the cover on the hatch frame and the preventing of the cover from working loose.

Referring particularly to Figs. 1 to 4, the illustrated embodiment of the invention is shown as comprising a cylindrical hatch frame 10 secured as by welding in a suitable opening in the roof R of a covered hopper car or similar railway car. The roof may be formed of steel sheets, a number of which may be so cut and assembled as to define the opening, through which the lower portion of the hatch frame 10 may depend. The upper end of the hatch frame is preferably formed with a downwardly turned flange as shown. A circular cover 11 of steel or the like with a depending peripheral flange is provided for the hatch frame, and is formed with an embossment shown as comprising a relatively small, substantially square central portion 12 from opposite sides of which relatively large flat areas 13 slope to the plane of the cover adjacent the peripheral portion but appreciably inwardly of the edge of the cover. The sloping areas 13 are fan-shaped, the sides of each being defined by a pair of upstanding webs 14 extending generally radially from the central portion 12. As is readily apparent from Fig. 1, each web is disposed substantially at right angles to the adjacent web of the other embossment area 13 and in substantial alignment with the opposite web of the other area. It is to be understood that the webs may vary in shape, number, and spacing from the arrangement shown and may be provided otherwise than by embossment of the cover, and the particular form of embossment may also differ from that shown, or a plurality of embossments may be provided. The webs serve to rigidify the cover and prevent warping or buckling thereof so that it will seat closely on the rim of the hatch frame, and also act to distribute uniformly over the cover sealing or closing pressure applied to the central portion 12.

A hinge bracket 15 of any suitable form is welded to the hatch frame 10 below the level of the cover flange and extends outwardly beyond the periphery of the cover. A hinge strap 16 of steel or other suitable metal extends over the cover 11 and is welded or otherwise secured to the central portion 12, being otherwise free of the cover and embossment, with its ends projecting outwardly of the cover. One end of the strap is bent downwardly and about a hinge pin 17, such as a bolt, secured in the bracket 15, so that the cover 11 is hinged on the hatch frame for swinging between open and closed positions. The other end of the strap 16 is also bent downwardly, and then outwardly at an angle to form a downwardly angled lip 18 which is adapted for locking engagement with the latch presently described. On the free end of the lip is an upwardly directed projection or boss 19 which may be formed in any suitable manner, as by bending, adding metal, or otherwise.

Figure 2:
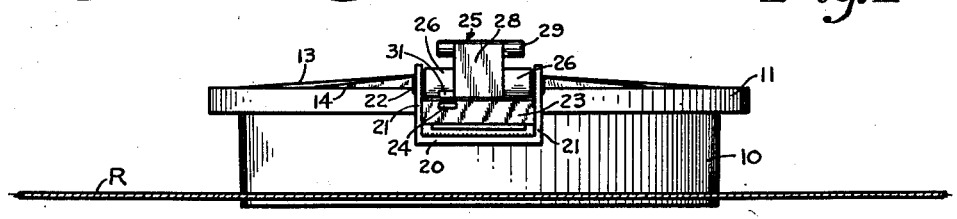
Fig. 2 is an elevation from one side of the hatchway showing the latch in locking position.
Figure 3:
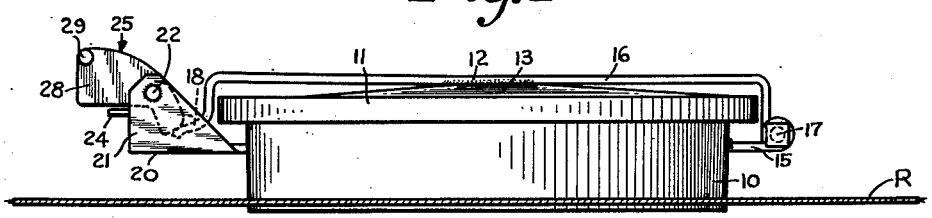
Fig. 3 is an elevational view taken at right angles to the view of Fig. 2.
Figure 4:
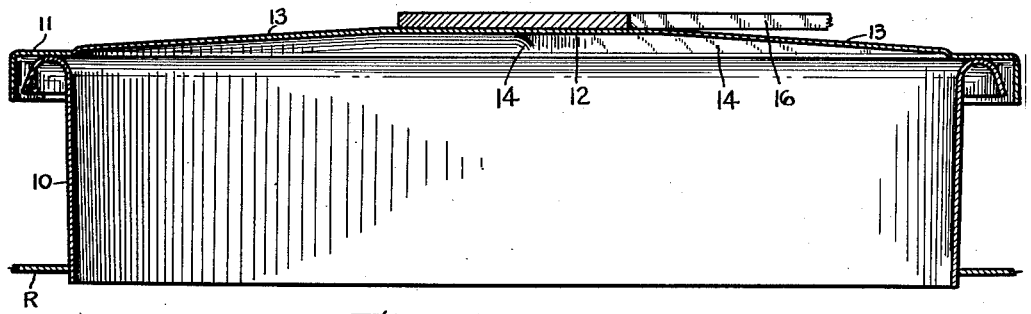
Fig. 4 is a vertical sectional view through the hatch frame and cover taken substantially as indicated by the line 4—4 of Fig. 1.

Welded to the hatch frame 10 diametrically opposite the hinge bracket 15 is a latch mounting bracket 20 extending outwardly beyond the edge of the cover 11 and adjacent the position of the lip 18 in closed position of the cover. The bracket 20 includes a pair of upstanding parallel ears 21 which support a pivot pin 22 extending horizontally between them, substantially at right angles to the strap 16. A stop bar 23 also extends between the ears, parallel to the pin 22 but outwardly and downwardly spaced therefrom. A horizontal apertured lug 24 extends outwardly from the stop bar adjacent one of the ears (Figs. 2 and 3). Pivoted on the pin 22 is a latch generally designated 25, provided as a relatively heavy mass of steel or the like having a somewhat L-shaped form, as best shown in Figs. 5 and 6, with aligned hubs 26 extending laterally from its opposite sides. A bore through the hubs and body of the latch receives the pivot pin 22. The latch has a latch portion 27 extending downwardly and inwardly from the pivot axis, and a counterweight portion 28 extending outwardly from the pivotal axis, the portion 28 forming the major part of the latch in size and weight, being sufficiently massive relative to the latch portion 27 that the center of gravity of the latch 25 is located within the counterweight portion well outward of the pivot axis. The lach portion is thus biased inwardly and upwardly relative to the hatch frame, its swinging movement in this direction, clockwise as viewed in Figs. 5 and 6, being limited by engagement of the portion 28 with the stop bar 23. Movement of the latch portion 27 in the opposite direction is limited by engagement of that portion itself against the stop bar. At the outer end of the latch, handles 29 project from the sides of the counterweight portion 28 to facilitate manipulation of the latch. The latch has a convex surface 30 extending over both the upper side of the latch portion 27 and the upper side of the counterweight portion 28. The free end of the latch portion 27 is in the form of a convexly curved surface and a rounded surface joins the convex surface 30 on the upper side of the latch portion with the convex surface on the free end of the latch portion. The convex surface on the free end of the latch portion 27 is joined with the lower side of the latch portion by a relatively sharp rounded edge. An apertured lug 31 extends laterally from one side of the counterweight portion 28 so as to overlie the lug 24 on the bracket when the latch is in locking position, so that a suitable seal may be passed through the lugs in the usual manner.

As is evident from Figs. 5 and 6, the latch 25 is so mounted that the latch portion 27 is normally disposed in the path followed by the lip 18 as the cover 11 is swung to and from closed position, but with the pivotal axis disposed outwardly of such path. When the cover is swung from open to closed position, the lip 18 engages the surface 30 of the latch when the cover nears the closed position, as indicated by the broken-line showing of Fig. 5, and in its continued downward movement swings the latch against the biasing action of the counterweight portion 28, more or less as shown by full lines in the figure, to move the latch portion out of the lip path so that the cover may pass to closed position and the lip may move under the free end of the latch portion 27. As the lip 18 passes beyond the latch surface 30, the latch portion is swung back into the lip path by movement of the latch 25 to the broken-line position of Fig. 5, due to the overbalancing action of the counterweight portion. The free end of the latch portion 27 thus comes into camming engagement with boss 19 on the lip 18, as shown in Fig. 6, and prevents return movement of the lip, or in other words locks the cover in closed position. It is to be noted that any opening tendency of the cover is prevented by the latch, which by reason of its camming engagement with the lip 18 would not tend to be moved out of the lip path, but on the contrary would tend to swing so that the latch portion 27 would extend farther into that path, if it was not already in its most extended position. This is of particular advantage in use of the invention on railway cars, since vibration of the cover and lip occasioned by movement of the car cannot result in the latch working loose from the lip. Any upward movement of the cover is firmly resisted by the latch and any downward movement merely permits the counterweight portion 28 to swing the latch portion 27 farther inwardly across the path of the lip 18. When the counterweight portion is in engagement with the stop bar 23, upward movement of the lip and cover is resisted by the stop bar as well as by the latch. In Fig. 6, the latch is shown as slightly spaced from engagement with the stop bar to illustrate clearly the action which would follow under the conditions as explained. The latch is automatically brought to locked condition by the cover itself, and the seal which may be applied serves as the usual pilferage protection. The cover need not be lowered gradually, but may be dropped to closed position, effecting locking engagement with the latch substantially in the manner already described. To disengage the latch when it is desired to open the hatch, the seal is broken and the latch swung clear of the lip 18 by means of either or both of the handles 29, when the cover may be swung open. It is to be noted that the center or gravity of the latch is always outwardly of its pivotal axis, so that the latch never remains in a position clear of the path of the lip unless positively held in such position.

When the cover is closed, it is pressed against the rim of the hatch by pressure applied to the raised central portion 12 by the hinge strap 16, the inherent resilience of which, when it is slightly flexed between the hinge and the latch, clamps the cover against the hatch frame. The webs 14 transmit the pressure substantially uniformly over the cover 11, and particularly about the peripheral portion which seats against the rim of the hatch frame, so that a substantially tight and even seal is effected all around the rim. Water and other foreign material is thus excluded from the interior of the car. Resilient sealing material may of course be employed if desired to provide more positive weather seal, but this is not necessary. The exclusion of foreign matter is enhanced by the flange about the rim of the hatch frame, which intercepts air currents flowing upwardly about the hatch frame and thus minimizes air pressure which might force such matter between the cover and hatch frame. The webs 14, in addition to distributing the sealing pressure over the cover, also strengthen and rigidify the cover so as to prevent its warping or buckling under the effects of use, extremes of temperature, and the like, and thus further contribute to the provision of a good sealing contact between the cover and hatch frame. The embossment disclosed represents a preferable type for the following reason. Although the car roof is shown as horizontal for convenience in illustration, it actually slopes from the center to the sides of the car, and the hatch frame being mounted perpendicular to the roof imparts a similar slope to the cover 11. The cover is so arranged on the hatch frame that the embossment extends in the direction of slope, one of the areas 13 being at the high edge portion of the cover. This prevents accumulation of water, dirt, and the like on the cover in any appreciable amount, since water, dust, cinders, and other material will find no appropriate surfaces against which to lodge, but will flow or otherwise pass around or over the embossment and off the lower edge portion of the cover. Rusting or other corrosive action due to accumulation of moisture or debris is thus avoided.

While the invention has been disclosed as embodied in a railway car hatchway, it is applicable to many other fields of use, such as trapdoors or other hinged closures, and is not intended to be limited to the specific application disclosed.

What is claimed is:

1. In a hatchway, a hatch frame, a cover for the hatch frame, a raised portion in the longitudinal and transverse center of the cover, a hinge for the cover, a stiffly resilient strap extending across the cover and fixed to the raised portion with its end portions free of the cover and one end of the strap being secured to the hinge and the other end of the strap projecting beyond the edge of the cover and having a lip thereon extending downwardly and outwardly relative to the faces of the cover, a boss at the end of the lip facing upwardly in the closed position of the cover, a horizontally disposed pivot disposed outwardly of and supported from the hatch frame, a latch mounted on the pivot to swing in a vertical plane and having a latch portion disposed on the side of the pivot adjacent the hatch frame and a relatively massive weighted portion on the opposite side of the pivot and integral with the latch portion and the free end of the latch portion having camming engagement with the boss and the weighted portion normally biasing the latch portion into the path followed by the lip in hinging movement of the cover, stop means limiting pivotal movement of the latch in both directions and permitting movement of the latch portion out of said path, a convexly curved surface on the upper side of the latch portion, a convexly curved surface on the free end of the latch portion, a rounded surface joining the first named convexly curved surface and the second named convexly curved surface, the first named convexly curved surface on the latch portion being engageable by the lip in closing movement of the cover to swing the latch portion downwardly out of said path for allowing the lip to move past the first named convexly curved surface over the rounded surface into contact with the second named convexly curved surface and effect resilient camming engagement between the boss and latch portion upon upward swinging of the latch portion into said path by the weighted portion to prevent return movement of the lip and cover.

2. In a hatchway, a hatch frame, a cover for the hatch frame, a raised portion in the longitudinal and transverse center of the cover, a hinge for the cover, a stiffly resilient strap extending across the cover and fixed to the raised portion with its end portions free of the cover and one end of the strap being secured to the hinge and the other end of the strap projecting beyond the edge of the cover and having a lip thereon extending downwardly and outwardly relative to the faces of the cover, a boss at the end of the lip facing upwardly in the closed position of the cover, a horizontally disposed pivot disposed outwardly of and supported from the hatch frame, a latch mounted on the pivot to swing in a vertical plane and having a latch portion disposed on the side of the pivot adjacent the hatch frame and a relatively massive weighted portion on the opposite side of the pivot and integral with the latch portion and the free end of the latch portion having camming engagement with the boss and the weighted portion normally biasing the latch portion into the path followed by the lip in hinging movement of the cover, a convexly curved surface on the upper side of the latch portion, a convexly curved surface on the free end of the latch portion, a rounded surface joining the first named convexly curved surface and the second named convexly curved surface, the first named convexly curved surface on the latch portion being engageable by the lip in closing movement of the cover to swing the latch portion downwardly out of said path for allowing the lip to move past the first named convexly curved surface over the rounded surface into contact with the second named convexly curved surface and effect resilient camming engagement between the boss and latch portion upon upward swinging of the latch portion into said path by the weighted portion to prevent return movement of the lip and cover.

References Cited in the file of this patent

UNITED STATES PATENTS

| 1,129,745 | Sherwood | Feb. 23, 1915 |
| 1,248,547 | Ray | Dec. 4, 1917 |
| 1,487,518 | Nichols et al. | Mar. 18, 1924 |
| 1,601,435 | Glenn et al. | Sept. 28, 1926 |
| 2,108,238 | Strelow | Feb. 15, 1938 |
| 2,154,545 | Thwaits | Apr. 18, 1939 |
| 2,159,178 | Rike | May 23, 1939 |
| 2,169,410 | Drane | Aug. 15, 1939 |
| 2,220,901 | Hartbauer | Nov. 12, 1940 |
| 2,246,470 | McArn et al. | June 17, 1941 |
| 2,260,570 | John | Oct. 28, 1941 |
| 2,279,666 | Etnyre | Apr. 14, 1942 |
| 2,324,356 | Brown | July 13, 1943 |
| 2,326,003 | Bailey et al. | Aug. 3, 1943 |

FOREIGN PATENTS

| 102,378 | Australia | Oct. 28, 1937 |